United States Patent
Lee et al.

(10) Patent No.: US 10,284,840 B2
(45) Date of Patent: May 7, 2019

(54) APPARATUS AND METHOD FOR REPRODUCING 3D IMAGE

(71) Applicants: Electronics and Telecommunications Research Institute, Daejeon (KR);
Hidea Solutions Co., Ltd., Seoul (KR);
Kookmin University Industry Academy Cooperation Foundation, Seoul (KR)

(72) Inventors: Joo Young Lee, Daejeon (KR); Sung Hoon Kim, Daejeon (KR); Se Yoon Jeong, Daejeon (KR); Jin Soo Choi, Daejeon (KR); Jin Woong Kim, Daejeon (KR); Suk Jin Hong, Seoul (KR); Jin Suk Kwak, Daejeon (KR); Dong Wook Kang, Seoul (KR); Kyeong Hoon Jung, Seoul (KR)

(73) Assignees: Electronics and Telecommunications Research Institute, Daejeon (KR);
Hidea Solutions Co., Ltd., Seoul (KR);
Kookmin University Industry Academy Cooperation Foundation, Seoul (KR)

(*) Notice: Subject to any disclaimer, the term of this patent is extended or adjusted under 35 U.S.C. 154(b) by 1216 days.

(21) Appl. No.: 14/317,934

(22) Filed: Jun. 27, 2014

(65) Prior Publication Data
US 2015/0002625 A1 Jan. 1, 2015

(30) Foreign Application Priority Data

Jun. 28, 2013 (KR) ........................ 10-2013-0075663
Jul. 12, 2013 (KR) ........................ 10-2013-0081931
Jun. 10, 2014 (KR) ........................ 10-2014-0070003

(51) Int. Cl.
*H04N 19/31* (2014.01)
*H04N 13/139* (2018.01)
*H04N 13/167* (2018.05)
*H04N 13/194* (2018.01)
*H04N 13/341* (2018.01)
(Continued)

(52) U.S. Cl.
CPC ......... *H04N 13/398* (2018.05); *H04N 13/139* (2018.05); *H04N 13/167* (2018.05);
(Continued)

(58) Field of Classification Search
CPC ........... H04N 13/0497; H04N 13/0051; H04N 13/0059; H04N 19/31; H04N 13/398;
(Continued)

(56) References Cited

U.S. PATENT DOCUMENTS

2011/0267424 A1* 11/2011 Koike .................. H04N 13/139
    348/43
2011/0310233 A1* 12/2011 Bathiche ................ H04N 13/32
    348/51

(Continued)

FOREIGN PATENT DOCUMENTS

KR    1020120063431 A    6/2012

OTHER PUBLICATIONS

Schulzrinne, H., Casner, S., Frederick, R., and V. Jacobson, RTP: A Transport Protocol for Real-Time Applications, STD 64, RFC 3550, DOI 10.17487/RFC3550, Jul. 2003, (Jul. 25, 2016), http://www.rfc-editor.org/info/rfc3550.*

*Primary Examiner* — David N Werner
(74) *Attorney, Agent, or Firm* — William Park & Associates Ltd.

(57) ABSTRACT

Provided is an apparatus and method for reproducing a three-dimensional (3D) image. A 3D image reproduction apparatus may include an image selector configured to select a left-eye image and a right-eye image based on a broadcast standard of a broadcast stream, and an image outputter configured to output the 3D image by synthesizing and output the left-eye image and the right-eye image in a 3D image format.

12 Claims, 5 Drawing Sheets

(51) Int. Cl.
*H04N 13/398* (2018.01)
*H04N 13/296* (2018.01)
*H04N 13/354* (2018.01)

(52) U.S. Cl.
CPC ......... *H04N 13/194* (2018.05); *H04N 13/341* (2018.05); *H04N 19/31* (2014.11); *H04N 13/296* (2018.05); *H04N 13/354* (2018.05)

(58) Field of Classification Search
CPC .. H04N 13/341; H04N 13/354; H04N 13/296; H04N 13/167
See application file for complete search history.

(56) References Cited

U.S. PATENT DOCUMENTS

| | | | |
|---|---|---|---|
| 2013/0222549 A1* | 8/2013 | Yoon | H04N 13/239 348/47 |
| 2014/0003523 A1* | 1/2014 | Soroushian | H04N 19/597 375/240.16 |
| 2014/0010294 A1* | 1/2014 | Ye | H04N 19/70 375/240.12 |
| 2014/0089962 A1* | 3/2014 | Ogawa | H04N 13/0051 725/29 |
| 2014/0168366 A1* | 6/2014 | Ichiki | H04N 19/597 348/43 |
| 2015/0249842 A1* | 9/2015 | Norkin | H04N 19/117 375/240.03 |
| 2016/0227249 A1* | 8/2016 | Choi | H04N 19/30 |
| 2017/0094288 A1* | 3/2017 | Hannuksela | H04N 19/105 |
| 2017/0287447 A1* | 10/2017 | Barry | G02B 27/017 |

\* cited by examiner

APPARATUS AND METHOD FOR REPRODUCING 3D IMAGE

CROSS-REFERENCE TO RELATED APPLICATIONS

This application claims the priority benefit of Korean Patent Application No. 10-2013-0075663, filed on Jun. 28, 2013, Korean Patent Application No. 10-2013-0081931, filed on Jul. 12, 2013, and Korean Patent Application No. 10-2014-0070003, filed on Jun. 10, 2014, in the Korean Intellectual Property Office, the disclosures of which are incorporated herein by reference.

BACKGROUND

1. Field of the Invention

Embodiments of the present invention relate to technology for supporting a three-dimensional (3D) broadcast service based on a heterogeneous broadcast network by selecting a left-eye image and a right-eye image from a received broadcast stream based on a broadcast standard, and outputting a 3D image by synthesizing the selected left-eye image and right-eye image in a 3D image format.

2. Description of the Related Art

Currently, with the increasing interest on a three-dimensional (3D) image, the development of a 3D image reproduction apparatus, such as a television (TV) and a monitor, capable of reproducing a 3D image has been continuously implemented.

In general, eyes of a person are positioned at spatially and slightly different locations and thus, may observe different images, for example, a left-eye image and a right-eye image when the person views an object. Such a difference in image location of the object is referred to as the principle of binocular parallax. The 3D image reproduction apparatus enables a user to perceive a 3D effect such as a depth and a perspective by displaying a 3D image based on the principle of binocular parallax.

A broadcast system that broadcasts a 3D image may transmit a broadcast stream including a left-eye image and a right-eye image in order to provide a 3DTV broadcast service to an in-house user based on the principle of binocular parallax.

A general 3D broadcast system employs a left-eye image stream and a right-eye image stream having the same frame rate and scan method. However, when transmitting a left-eye broadcast stream and a right-eye broadcast stream over different existing two-dimensional (2D) broadcast networks, for example, a fixed 2D broadcast network and a mobile broadcast network, a left-eye image and a right-eye image in a broadcast stream received at a 3D image reproduction apparatus of an in-house user may have a different frame rate and scan method.

Also, when a broadcast system transmits a left-eye image and a right-eye image to have different frame rates, only one of the left-eye image and the right-eye image may be present at a predetermined viewpoint. In this case, an existing 3D broadcast receiver may not perform synthesis into a 3D image. Similarly, when the broadcast system transmits the left-eye image and the right-eye image using different scan methods, for example, a progressive scan method and an interlaced scan method, an image transmitted using the interlaced scan method is present only in a half, for example, a top field or a bottom field and thus, a separate method for synthesis into a 3D image is required.

Accordingly, there is a need for technology capable of outputting a 3D image by synthesizing the selected left-eye image and right-eye image in a 3D image format. when a broadcast standard of a broadcast stream transmitted from a broadcast system over a heterogeneous broadcast network is different.

SUMMARY

An aspect of the present invention is to support a three-dimensional (3D) broadcast service based on a heterogeneous broadcast network by selecting a left-eye image and a right-eye image from a broadcast stream based on a broadcast standard, and outputting a 3D image by synthesizing the selected left-eye image and right-eye image in a 3D image format.

Also, an aspect of the present invention is to output a 3D image by synthesizing a left-eye image and a right-eye image having different frame rates or scan methods, as an example of a broadcast standard.

Also, an aspect of the present invention is to increase a frame rate of a 3D image to be output by synthesizing a left-eye image and a right-eye image by further using an intermediate image created based on a predetermined algorithm such as a motion estimation algorithm and a motion compensation algorithm.

According to an aspect of the present invention, there is provided an apparatus for reproducing a 3D image, the apparatus including: an image selector configured to select a left-eye image and a right-eye image based on a broadcast standard of a broadcast stream; and an image outputter configured to output a 3D image by synthesizing the left-eye image and the right-eye image in a 3D image format.

According to another aspect of the present invention, there is provided a method of reproducing a 3D image, the method including: selecting a left-eye image and a right-eye image based on a broadcast standard of a broadcast stream; and outputting a 3D image by synthesizing the selected left-eye image and right-eye image in a 3D image format.

Effects

According to embodiments of the present invention, it is possible to support a three-dimensional (3D) broadcast service based on a heterogeneous broadcast network by selecting a left-eye image and a right-eye image from a received broadcast stream based on a broadcast standard, and outputting a 3D image by synthesizing the selected left-eye image and right-eye image in a 3D image format.

Also, according to embodiments of the present invention, it is possible to output a 3D image by synthesizing a left-eye image and a right-eye image having different frame rates or scan methods, as an example of a broadcast standard.

Also, according to embodiments of the present invention, it is possible to increase a frame rate of a 3D image to be output by synthesizing a left-eye image and a right-eye image by further using an intermediate image created based on a predetermined algorithm such as a motion estimation algorithm and a motion compensation algorithm.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Reference will now be made in detail to embodiments of the present invention, examples of which are illustrated in the accompanying drawings, wherein like reference numerals refer to like elements throughout. Embodiments are described below to explain the present invention by referring to the figures.

Figure 1:
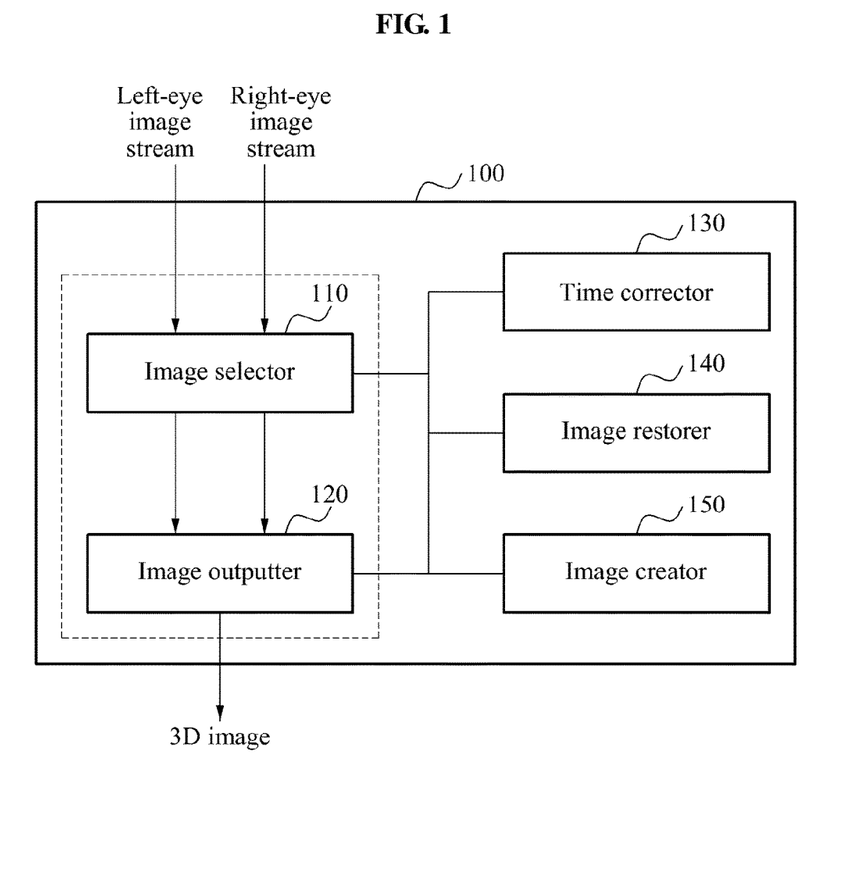
FIG. 1 is a block diagram illustrating a configuration of an apparatus for reproducing a three-dimensional (3D) image according to an embodiment of the present invention.

FIG. 1 is a block diagram illustrating a configuration of an apparatus 100 for reproducing a three-dimensional (3D) image according to an embodiment of the present invention.

Referring to FIG. 1, the 3D image reproduction apparatus 100 may include an image selector 110 and an image outputter 120. Depending on embodiments, the 3D image reproduction apparatus 100 may further include a time corrector 130, an image restorer 140, and an image creator 150.

The image selector 110 may select a left-eye image and a right-eye image based on a broadcast standard of a broadcast stream.

The broadcast stream may be transmitted from a broadcast system that provides a 3D broadcast service. The broadcast system may classify the broadcast stream into a left-eye image stream and a right-eye image stream and thereby transmit the broadcast stream, to reproduce a 3D image based on the principle of binocular parallax.

The left-eye image stream may include a plurality of left-eye images and the right-eye image stream may include a plurality of right-eye images. A left-eye image refers to an image viewed by the left eye of the user and a right-eye image refers to an image viewed by the right eye of the user.

Here, one of the left-eye image and the right-eye image may be set as a main image for 3D broadcast and the other one of the left-eye image and the right-eye image may be set as an additional image. The broadcast system may transmit the main image and the additional image using the same radio frequency (RF) channel. Here, the main image and the additional image may be transmitted over different broadcast networks. For example, the main image may be transmitted according to an Advanced Television Systems Committee (ATSC) main service and the additional image may be transmitted according to an ATSC mobile digital television (DTV) service. The 3D image reproduction apparatus 100 may use the main image to provide a two-dimensional (2D) broadcast and may use the main image and the additional image to provide a 3D broadcast.

The frame rate of the ATSC Mobile DTV service may be that of the ATSC main DTV service divided by an integer, including one. Here, a frame rate of the additional image transmitted according to the ATSC mobile DTV service may be a result value obtained by dividing a frame rate of the main image transmitted according to the ATSC main service by an integer. Here, the integer may include "one (1)". For example, when the integer is "1", the frame rate of the additional image may be equal to the frame rate of the main image. The frame rate of the additional image may be a value obtained by dividing the frame rate of the main image by an integer, such as "2", "3", and "4", instead of "1".

When the frame rate of the additional image is a value obtained by dividing the frame rate of the main image by the integer including "1", a frame of the main image to match a frame of the additional image may be selected using a timestamp offset-based synchronization method. When the frame rate of the ATSC Mobile DTV service is that of the ATSC main DTV service divided by an integer, other than one, the frames of ATSC main service to be matched to the counterparts are selected by the timestamps in the same synchronization manner Accordingly, the broadcast system may transmit an image stream corresponding to the main stream and an image stream corresponding to the additional image to the 3D image reproduction apparatus 100 based on different broadcast standards. The frame rate of the additional image may be a value obtained by dividing the frame rate of the main image by the integer including "1".

Here, a different broadcast standard may be employed for each of the left-eye image stream and the right-eye image stream.

As an example, the left-eye image stream and the right-eye image stream may have different frame rates. For example, the broadcast system may transmit the left-eye image stream at the frame rate of 60 fps and may transmit the right-eye image stream at the frame rate of 30 fps.

Here, a frame rate being different indicates that a frame rate of one image stream is an integer multiple of a frame rate of the other image stream. For example, a frame rate being different may indicate that a frame rate of a left-eye image stream is greater by a multiple of an integer including "1" than the frame rate of the right-eye image stream.

Alternatively, a left-eye image stream and a right-eye image stream may use different scan methods. For example, the broadcast system may transmit the left-eye image stream using an interlaced scan method and may transmit the right-eye image stream using a progressive scan method.

Also, when the left-eye image stream and the right-eye image stream are transmitted from the broadcast system over different heterogeneous broadcast networks, for example, a fixed 2D broadcast network and a mobile broadcast network, having different broadcast standards, broadcast standards, for example, a frame rate and a scan method, of the received left-eye image stream and right-eye image stream may differ.

Accordingly, a left-eye image included in the left-eye image stream and a right-eye image included in the right-eye image stream may have different broadcast standards.

As an example, when a frame rate of the left-eye image and a frame rate of the right-eye image differ, the image selector 110 may verify output time information of the left-eye image and output time information of the right-eye image from the broadcast system that transmits the broadcast stream, and may select the left-eye image and the right-eye image having the same output time information.

When transmitting the left-eye image stream and the right-eye image stream, the broadcast system may also transmit output time information on a time at which each of left-eye images included in the left-eye image stream is output and output time information on a time at which each of right-eye images included in the right-eye image stream is output.

Although the left-eye image and the right-eye image are received at different frame rates, the image selector 110 may readily select the right-eye image that matches the left-eye image or the left-eye image that matches the right-eye image, based on the output time information.

Accordingly, when outputting a 3D image, the 3D image reproduction apparatus 100 may ignore a mismatching left-eye image or right-eye image and may synthesize a matching left-eye image and right-eye image.

Here, the output time information may include timestamp information. The timestamp information may be received from the broadcast system that transmits the broadcast stream, for example, the left-eye image stream and the right-eye image stream. When timestamp information of the left-eye image and timestamp information of the right-eye image is based on the same reference clock, the image selector 110 may select the left-eye image and the right-eye image having the same output time information as matching images that constitute the 3D image.

Depending on embodiments, the 3D image reproduction apparatus 100 may further include the time corrector 130 configured to correct output time information when a reference clock used for the left-eye image and a reference clock used for the right-eye image are independently calculated.

When the reference clock used for the left-eye image and the reference clock used for the right-eye image for example, a PCR (Program Clock Reference) and an MPEG-2, are independently calculated, the time corrector 130 may correct output time information based on first synchronization information received from the broadcast system. The image selector 110 may select the left-eye image and the right-eye image having the same output time information based on the corrected output time information.

Here, the first synchronization information may be an offset corresponding to a difference value between output time information of the left-eye image and output time information of the right-eye image.

For example, when first synchronization information "1000" is received from the broadcast system, the time corrector 130 may correct output time information "4000" of the right-eye image to "3000" based on the first synchronization information "1000". In response to correcting the output time information of the right-eye image to "3000", the image selector 110 may select a left-eye image having the same output time information "3000" as an image that matches the right-eye image.

A format of output time information of the left-eye image and a format of output time information of the right-eye image may differ, such as a presentation timestamp (PTS) and a real-time transport protocol (RTP) timestamp. Output time information in a format of the PTS may include 33 bits, and output time information in a format of the RTP timestamp may include 32 bits.

Depending on embodiments, when a format of output time information of the left-eye image and a format of output time information of the right-eye image differ, the time corrector 130 may correct output time information based on second synchronization information received from the broadcast system. The image selector 110 may select the left-eye image and the right-eye image having the same output time information based on the corrected output time information.

Here, when output time information of the left-eye image is provided in a format of a PTS and output time information of the right-eye image is provided in a format of an RTP timestamp, the second synchronization information may be an offset corresponding to a difference value between remaining bits excluding a most significant bit of the PTS and bits of the RTP timestamp.

For example, when the PTS and the RTP timestamp use the same reference clock of "90 kHz", the 3D image reproduction apparatus 100 may receive, as the second synchronization information, a difference value "1030" between lower 32 bits excluding a most significant bit "1 bit" of the PTS and 32 bits of the RTP timestamp. The time corrector 130 may correct output time information "4030" of a right-eye image to "3000", based on the second synchronization information "1030". In response to correcting the output time information of the right-eye image to "3000", the image selector 110 may select a left-eye image having the same output time information "3000" as an image that matches the right-eye image.

When the time corrector 130 compares output time information of the left-eye image to output time information of the right-eye image, and when a difference value between output time information of the left-eye image and output time information of the right-eye image is within an error range, output time information of the left-eye image and output time information of the right-eye image may be construed to be equal to each other.

As an example, when output time information of a left-eye image has a value of "1000000005" in a format of a PTS and output time information of a right-eye image has a value of "1000000006" in a format of a PTS, and when an error range is set as "10", the time corrector 130 may determine that output time information of the left-eye image and output time information of the right-eye image is equal to each other.

Similarly, when output time information of a left-eye image is provided in a format of a PTS and output time information of the right-eye image is provided in a format of an RTP timestamp, and when a difference value between output time information of the left-eye image and output time information of the right-eye image is within a predetermined error range, the time corrector 130 may determine that output time information of the left-eye image and output time information of the right-eye is equal to each other.

The time corrector 130 may verify and compare output time information of a left-eye image and output time information of a right-eye image periodically with respect to all the images after playback of the received broadcast stream starts. The time corrector 130 may verify and compare output time information of a left-eye image and output time information of a right-eye image at a point in time when playback of the received broadcast stream starts. In this case, the image selector 110 may select a frame, for example, the left-eye image and the right-eye image to be used for synthesis of a 3D image using a known frame rate and reference clock.

The image outputter 120 may output a 3D image by synthesizing the selected left-eye image and right-eye image in a 3D image format.

As an example, the image outputter 120 may synthesize the left-eye image and the right-eye image in at least one 3D image format among a side-by-side format, a top-and-bottom format, and a frame sequential format.

The image outputter 120 may output an 3D image in a 3D image format to a display device (not shown) connected through various types of image output interfaces, for example, a high definition multimedia interface (HDMI), a digital visual interface (DVI), a D-subminiature, a component, and a composite. Alternatively, when the display device is integrated in the 3D image reproduction apparatus 100, the image outputter 120 may output the 3D image in the 3D image format using an exclusive output method.

Depending on embodiments, to restore the left-eye image and the right-eye image as a complete frame using a field, for example, a top field and a bottom field, selected as an output image when at least one of the left-eye image stream and the right-eye image stream is transmitted using an interlaced scan method, the 3D image reproduction apparatus 100 may further include the image restorer 140.

The image restorer 140 may restore the left-eye image and the right-eye image as the complete frame using the field selected as the output image. The image outputter 120 may output the 3D image by synthesizing the left-eye image and the right-eye image in the 3D image format using the left-eye image and the right-eye image restored as the complete frame.

A field constituting an image stream of the interlaced scan method may be, for example, a top field or a bottom field that includes a half of the left-eye image or the right-eye image. The top field may refer to an image acquired by horizontally scanning odd columns including a top pixel column in the left-eye image or the right-eye image. The bottom field may refer to an image acquired by horizontally scanning even columns (see (i) of FIG. 3).

As an example, the image restorer 140 may restore a left-eye image or a right-eye image by merging, into a complete single frame, a top field and a bottom field having the same output time information according to a weaving method.

Alternatively, when the top field and the bottom field have different output time information, the image restorer 140 may restore a field selected for output as a single complete image using widely known de-interlacing methods, for example, a line doubling method and a motion detection method. Alternatively, the image restorer 140 may restore a left-eye image or a right-eye image by creating a remaining field of the top field or the bottom field selected for output, using a single field or a plurality of fields created before and after the field selected for output based on at least one of a motion estimation algorithm and a motion compensation algorithm.

Also, depending on embodiments, to increase a frame rate for quality enhancement of a 3D image to be output, the 3D image reproduction apparatus 100 may further include the image creator 150.

The image creator 150 may create an intermediate image to be positioned between front and rear of each of the left-eye image and the right-eye image, based on at least one of a motion estimation algorithm and a motion compensation algorithm. The image outputter 120 may output the 3D image by synthesizing the left-eye image and the right-eye image in which the intermediate image is included, in the 3D image format.

The image creator 150 may increase the frame rate by creating the intermediate image based on the algorithm, in addition to the selected left-eye image and right-eye image.

For example, when a left-eye image and a right-eye image each including 30 frames per second are selected, the image creator 150 may increase a frame rate from 30 fps to 60 fps or 120 fps by creating an intermediate image based on the algorithm.

When one of the left-eye image and the right-eye image has a relatively high frame rate, the image creator 150 may include an unselected image, for example, an unselected left-eye image or an unselected right-eye image as an output image.

For example, when using a left-eye image including 60 frames per second and a right-eye image including 30 frames per second, and in this instance, selecting 30 frames from each of the left-eye image and the right-eye image, the image creator 150 may include, in an output image, the left-eye image corresponding to the remaining 30 frames from among the 60 frames of the left-eye image. Also, the image creator 150 may convert the right-eye image including 30 frames per second to the right-eye image including 60 frames per second by creating an intermediate image using an algorithm. Accordingly, the image outputter 120 may output a 3D image having a frame rate of 60 fps.

Alternatively, the image creator 150 may create a 3D image having a further higher frame rate by performing an additional up-conversion on the left-eye image and the right-eye image that are acquired through the above process and have the same frame rate. For example, when the left-eye image has a frame rate of 60 fps and the right-eye image has a frame rate of 30 fps, the image creator 150 may acquire a 3D image of 120 fps by acquiring a right-eye image of 60 fps using the intermediate image and then performing again an intermediate image creating process on the left-eye image of 60 fps and the right-eye image of 60 fps. Accordingly, the image outputter 120 may output the 3D image having a high frame rate of 120 fps.

Therefore, according to embodiments of the present invention, it is possible to support a 3D broadcast service based on a heterogeneous broadcast network by selecting a left-eye image and a right-eye image from a received broadcast stream based on a broadcast standard, and outputting the 3D image by synthesizing the selected left-eye image and right-eye image in a 3D image format.

Also, according to embodiments of the present invention, it is possible to output a 3D image by synthesizing a left-eye image and a right-eye image having different frame rates or scan methods, as an example of a broadcast standard.

Also, according to embodiments of the present invention, it is possible to increase a frame rate of a 3D image to be output by synthesizing a left-eye image and a right-eye image by further using an intermediate image created based on a predetermined algorithm such as a motion estimation algorithm and a motion compensation algorithm.

Hereinafter, a process of selecting, by the image selector 110, a left-eye image and a right-eye image will be further described.

When a frame rate of a left-eye image stream has a value corresponding to an n multiple of a frame rate of a right-eye image stream, the image selector 110 may select a left-eye image and a right-eye image that match each other, based on the right-eye image stream having a relatively low frame rate between the left-eye image stream and the right-eye image stream.

Figure 2:
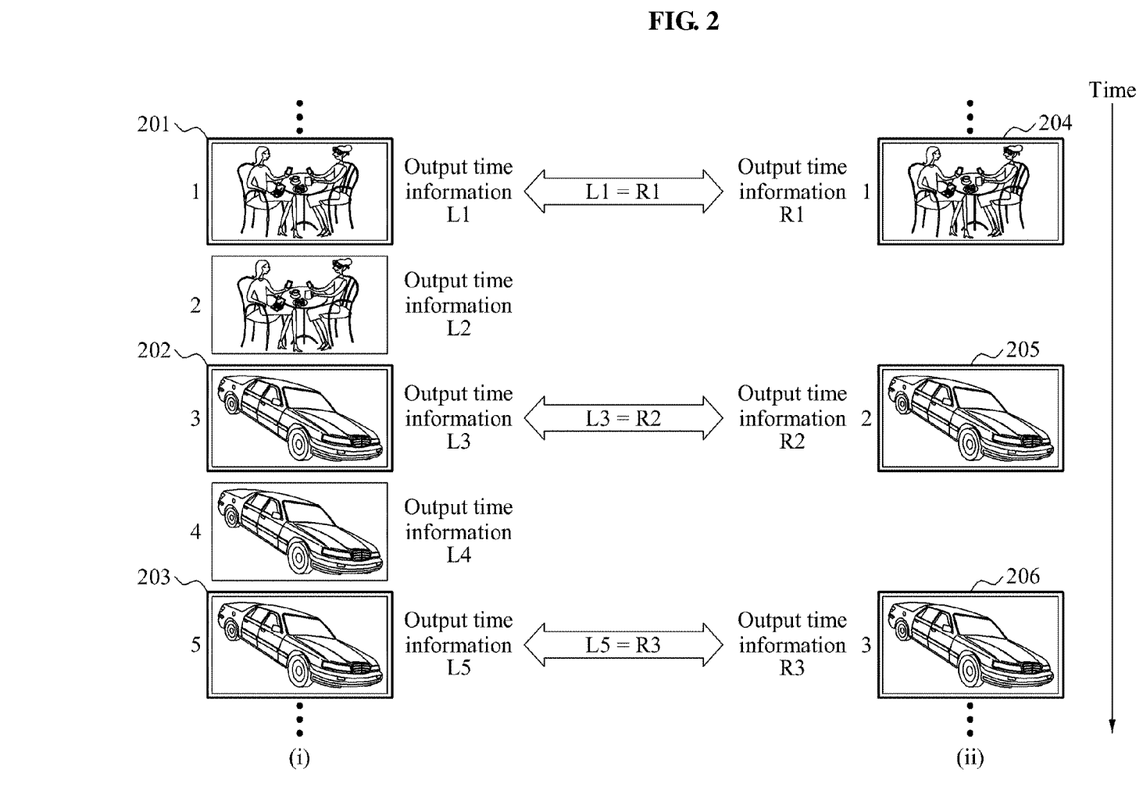
FIG. 2 illustrates an example of selecting a left-eye image and a right-eye image when the left-eye image and the right-eye image have different frame rates according to an embodiment of the present invention.

For example, when a frame rate of a left-eye image stream is higher by double than a frame rate of a right-eye image stream, the image selector 110 may select all the right-eye images included in the right-eye image stream having a relatively low frame rate and may select each one left-eye image per two left-eye images (see FIG. 2).

Also, when output time information of a right-eye image indicates a predetermined time, the image selector 110 may select a left-eye image having the same output time information as output time information of the right-eye image.

As an example, output time information of a left-eye image and output time information of a right-eye image may vary based on a broadcast standard. For example, when output time information between a left-eye image stream and a right-eye image stream uses an MPEG-2 PTS, and when the left-eye image stream and the right-eye image stream use the same reference clock, for example, a PCR, a left-eye image and a right-eye image output at the same point in time may have the same PTS value. Accordingly, the image selector 110 may acquire a PTS value of the right-eye image and then may retrieve a left-eye image having the same PTS value as the PTS value of the right-eye image. Here, the image selector 110 may ignore a left-eye image having a PTS value different from the PTS value of the right-eye image.

As another example, when output time information of a left-eye image and output time information of a right-eye image is provided in a format of a PTS, however, uses independently calculated reference clocks, for example, a PCR and an MPEG-2, a left-eye image and a right-eye image output at the same point in time may have different PTS values. Here, the 3D image reproduction apparatus 100 may acquire, from the broadcast stream, first synchronization information used to match output time information of the left-eye image and output time information of the right-eye image. The image selector 110 may retrieve and select the left-eye image and the right-eye image having output time information that is corrected based on the first synchronization information, that is, having the same PTS value.

Here, the first synchronization information may be an offset corresponding to a difference value between a PTS value of the left-eye image and a PTS value of the right-eye image. For example, when the image selector 110 receives an offset "1000" between output time information of a left-eye image and output time information of a right-eye image, for example, between a PTS value of the left-eye image and a PTS of the right-eye image as first synchronization information, output time information of the left-eye image that matches output time information "3000" of the right-eye image may be "4000". As described above, the image selector 110 may retrieve the left-eye image that matches the right-eye image or the right-eye image that matches the left-eye image through a timestamp correction.

As another example, although a left-eye image stream and a right-eye image stream use different output time information, the image selector 110 may retrieve a left-eye image and a right-eye image that match each other through a timestamp conversion. For example, when a left-eye image uses output time information in a format of an RTP timestamp and a right-eye image uses output time information in a format of a PTS, the time corrector 130 may use a timestamp offset between the left-eye image and the right-eye image as second synchronization information. Although the PTS includes 33 bits and the RTP timestamp includes 32 bits, the two timestamps may have the same clock rate of 90 kHz. In this case, the 3D image reproduction apparatus 100 may separately receive, as second synchronization information, an offset corresponding to a difference value between lower 32 bits excluding a most significant bit "1 bit" of the PTS and 32 bits of the RTP timestamp. Accordingly, the image selector 110 may retrieve and select a left-eye image and a right-eye image in which lower 32 bits of ae PTS value corrected based on second synchronization information and the RTP timestamp value match.

FIG. 2 illustrates an example of selecting a left-eye image and a right-eye image when the left-eye image and the right-eye image have different frame rates according to an embodiment of the present invention.

A left-eye image stream transmitted at a frame rate of 60 fps is illustrated in (i) of FIG. 2, and a right-eye image stream transmitted at a frame rate of 30 fps is illustrated in (ii) of FIG. 2.

An example in which the left-eye image stream and the right-eye image stream are transmitted using a progressive scan method is illustrated in (i) and (ii) of FIG. 2.

Referring to FIG. 2, since the frame rate of the left-eye image stream is higher by double than the frame rate of the right-eye image stream, a 3D image reproduction apparatus according to an embodiment of the present invention may select all the right-eye images 204, 205, and 206 included in the right-eye image stream having a relatively low frame rate, and may select each single left-eye image per two left-eye images. For example, the 3D image reproduction apparatus may select left-eye images 201, 202, and 203 having the same output time information as output time information of the right-eye images 204, 205, and 206, and may synthesize and output the selected images into a 3D image format.

Figure 3:
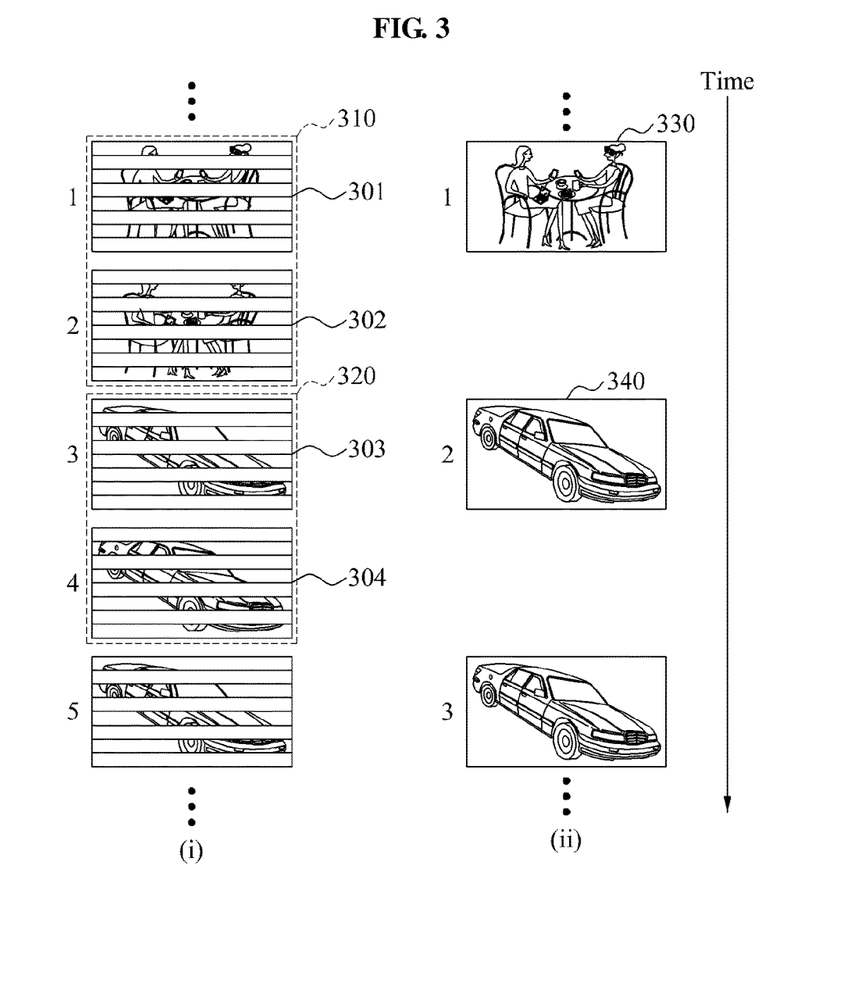
FIG. 3 illustrates an example of selecting a left-eye image and a right-eye image when the left-eye image and the right-eye image use different scan methods according to an embodiment of the present invention.

FIG. 3 illustrates an example of selecting a left-eye image and a right-eye image when the left-eye image and the right-eye image use different scan methods according to an embodiment of the present invention.

A left-eye image stream transmitted using an interlaced scan method is illustrated in (i) of FIG. 3, and a right-eye image stream transmitted using a progressive scan method is illustrated in (ii) of FIG. 3.

An example in which a left-eye image including 60 frames per second and a right-eye image including 30 frames per second are transmitted is illustrated in (i) and (ii) of FIG. 3.

A 3D image reproduction apparatus according to an embodiment of the present invention may restore the left-eye image by merging, into a complete single frame, a top field and a bottom field having the same output time information in the left-eye image stream transmitted using the interlaced scan method.

Referring to FIG. 3, the 3D image reproduction apparatus may restore a left-eye image 310 by merging a number 1 top field 301 and a number 2 bottom field 302 into a complete single frame. Also, the 3D image reproduction apparatus may restore a left-eye image 320 by merging a number 3 top field 303 and a number 4 bottom field 302 into a complete single frame.

Accordingly, the 3D image reproduction apparatus may select the left-eye image 310 and a right-eye image 330 having the same output time information. Similarly, the 3D image reproduction apparatus may select the left-eye image 320 and a right-eye image 340, and may synthesize and output the selected images into a 3D image format.

Alternatively, when output times of a sequential top field and a bottom field using the interlaced scan method differ, the 3D image reproduction apparatus may restore an empty portion of a selected field image as a complete frame using an algorithm, instead of creating the complete frame by combining consecutive fields.

Referring to FIG. 3, when the number 1 top field 301 is selected as an output image, the 3D image reproduction apparatus may restore an empty bottom field using a de-interlacing method or a motion estimation algorithm and a motion compensation algorithm, to restore the number 1 top field 301 as a single image instead of combining the selected number 1 top field 301 and the number 2 bottom field 302 having a different output time.

Hereinafter, an operation of a 3D image reproduction apparatus according to an embodiment of the present invention will be described with reference to FIGS. 4 and 5.

Figure 4:
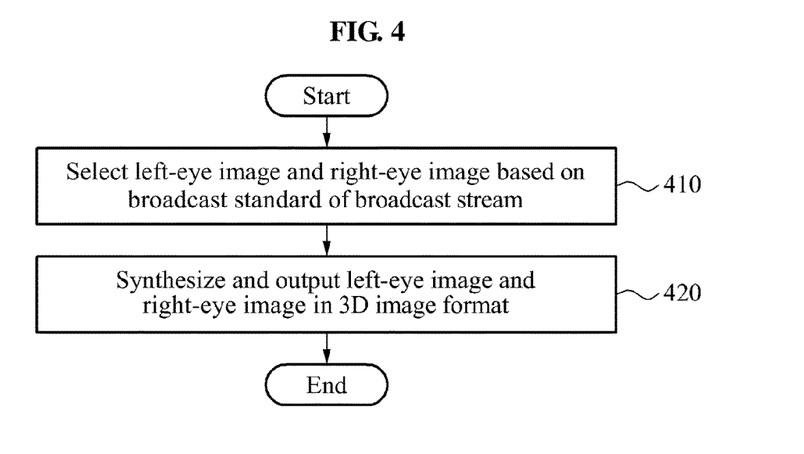
FIG. 4 is a flowchart illustrating a method of reproducing a 3D image according to an embodiment of the present invention.

FIG. 4 is a flowchart illustrating a method of reproducing a 3D image according to an embodiment of the present invention.

The 3D image reproduction method of FIG. 4 may be performed by the 3D image reproduction apparatus 100 of FIG. 1 according to an embodiment of the present invention.

In operation 410, the 3D image reproduction apparatus 100 may select a left-eye image and a right-eye image based on a broadcast standard of a broadcast stream.

When a frame rate of the left-eye image and a frame rate of the right-eye image differ, the 3D image reproduction apparatus 100 may verify output time information of the left-eye image and output time information of the right-eye image from a broadcast system that transmits the broadcast stream, and may select the left-eye image and the right-eye image having the same output time information.

Accordingly, when outputting a 3D image, the 3D image reproduction apparatus 100 may ignore a mismatching left-eye image or right-eye image and may synthesize a matching left-eye image and right-eye image.

Here, the output time information may include timestamp information. The timestamp information may be received from the broadcast system that transmits the broadcast stream, for example, a left-eye image stream and a right-eye image stream. When timestamp information of the left-eye image and timestamp information of the right-eye image is based on the same reference clock, the 3D image reproduction apparatus 100 may select the left-eye image and the right-eye image having the same output time information as matching images that constitute the 3D image.

Depending on embodiments, when a reference clock used for the left-eye image and a reference clock used for the right-eye image are independently calculated, the 3D image reproduction apparatus 100 may correct output time information based on first synchronization information received from the broadcast system. The 3D image reproduction apparatus 100 may select the left-eye image and the right-eye image having the same output time information based on the corrected output time information.

Here, the first synchronization information may be an offset corresponding to a difference value between output time information of the left-eye image and output time information of the right-eye image.

For example, when first synchronization information "1000" is received from the broadcast system, the 3D image reproduction apparatus 100 may correct output time information "4000" of the right-eye image to "3000" based on the first synchronization information "1000". In response to correcting the output time information of the right-eye image to "3000", the 3D image reproduction apparatus 100 may select a left-eye image having the same output time information "3000" as an image that matches the right-eye image.

Depending on embodiments, when a format of output time information of the left-eye image and a format of output time information of the right-eye image differ, the 3D image reproduction apparatus 100 may correct output time information based on second synchronization information received from the broadcast system. The 3D image reproduction apparatus 100 may select the left-eye image and the right-eye image having the same output time information based on the corrected output time information.

Here, when output time information of the left-eye image is provided in a format of a PTS and output time information of the right-eye image is provided in a format of an RTP timestamp, the second synchronization information may be an offset corresponding to a difference value between remaining bits excluding a most significant bit of the PTS and bits of the RTP timestamp.

For example, when the PTS and the RTP timestamp use the same reference clock of "90 kHz", the 3D image reproduction apparatus 100 may receive, as the second synchronization information, a difference value "1030" between lower 32 bits excluding a most significant bit "1 bit" of the PTS and 32 bits of the RTP timestamp. The 3D image reproduction apparatus 100 may correct output time information "4030" of a right-eye image to "3000", based on the second synchronization information "1030". In response to correcting the output time information of the right-eye image to "3000", the 3D image reproduction apparatus 100 may select a left-eye image having the same output time information "3000" as an image that matches the right-eye image.

In operation 420, the 3D image reproduction apparatus 100 may synthesize and output the left-eye image and the right-eye image in a 3D image format.

As an example, the 3D image reproduction apparatus 100 may synthesize and output the left-eye image and the right-eye image in at least one 3D image format among a side-by-side format, a top-and-bottom format, and a frame sequential format.

As described above, according to embodiments of the present invention, it is possible to support a 3D broadcast service based on a heterogeneous broadcast network by selecting a left-eye image and a right-eye image from a broadcast stream based on a broadcast standard, and outputting the 3D image by synthesizing the selected left-eye image and right-eye image in a 3D image format.

Depending on embodiments, the 3D image reproduction apparatus 100 may create an intermediate image to be positioned between front and rear of each of the left-eye image and the right-eye image, based on at least one of a motion estimation algorithm and a motion compensation algorithm. The 3D image reproduction apparatus 100 may increase the frame rate by synthesizing the left-eye image and the right-eye image in which the intermediate image is included, in a 3D image format.

For example, when a left-eye image and a right-eye image each including 30 frames per second are selected, the 3D image reproduction apparatus 100 may increase a frame rate from 30 fps to 60 fps or 120 fps by creating an intermediate image based on the algorithm.

Figure 5:
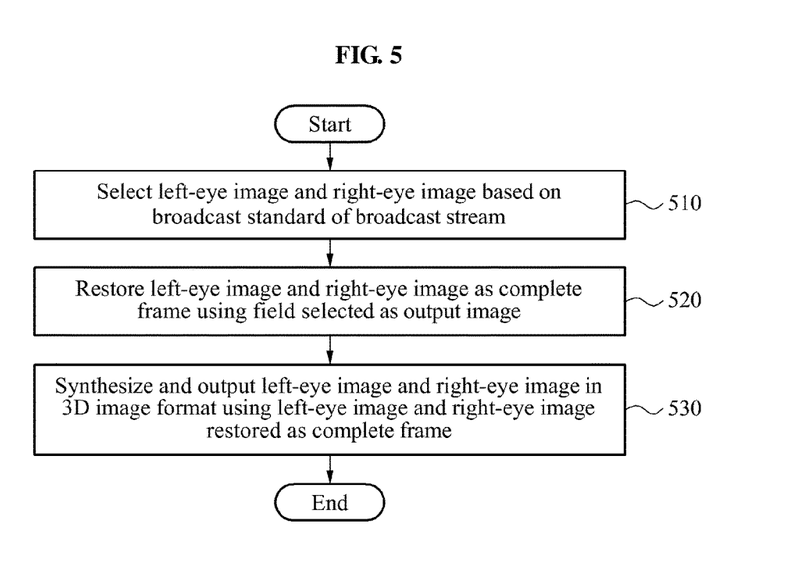
FIG. 5 is a flowchart illustrating a method of reproducing a 3D image according to another embodiment of the present invention.

FIG. 5 is a flowchart illustrating a method of reproducing a 3D image according to another embodiment of the present invention.

The 3D image reproduction method of FIG. 5 may be performed by the 3D image reproduction apparatus 100 of FIG. 1 according to an embodiment of the present invention.

In operation 510, the 3D image reproduction apparatus 100 may select a left-eye image and a right-eye image based on a broadcast standard of a broadcast stream.

When a frame rate of the left-eye image and a frame rate of the right-eye image differ, the 3D image reproduction apparatus 100 may verify output time information of the left-eye image and output time information of the right-eye image from a broadcast system that transmits the broadcast stream, and may select the left-eye image and the right-eye image having the same output time information.

Accordingly, when outputting a 3D image, the 3D image reproduction apparatus 100 may ignore a mismatching left-eye image or right-eye image and may synthesize a matching left-eye image and right-eye image.

In operation 520, the 3D image reproduction apparatus 100 may restore the left-eye image and the right-eye image as a complete frame using a field selected as an output image, when at least one of the left-eye image and the right-eye image is transmitted using an interlaced scan method.

When at least one of the left-eye image and the right-eye image is transmitted using an interlaced scan method, the 3D image reproduction apparatus 100 may restore the left-eye image and the right-eye image as the complete frame using the field selected as the output image. The 3D image reproduction apparatus 100 may output the 3D image by synthesizing the left-eye image and the right-eye image in a 3D image format using the left-eye image and the right-eye image restored as the complete frame.

A field constituting an image stream of the interlaced scan method may be, for example, a top field or a bottom field that includes a half of the left-eye image or the right-eye image. The top field may refer to an image acquired by horizontally scanning odd columns including a top pixel column in the left-eye image or the right-eye image. The bottom field may refer to an image acquired by horizontally scanning even columns (see (i) of FIG. 3).

As an example, the 3D image reproduction apparatus 100 may restore a left-eye image or a right-eye image by merging, into a complete single frame, a top field and a bottom field having the same output time information according to a weaving method.

Alternatively, when the top field and the bottom field have different output time information, the 3D image reproduction apparatus 100 may restore a field selected for output as a single complete image using widely known de-interlacing methods, for example, a line doubling method and a motion detection method. Alternatively, the 3D image reproduction apparatus 100 may restore a left-eye image or a right-eye image by creating a remaining field of the top field or the bottom field selected for output, using a single field or a plurality of fields created before and after the field selected for output based on at least one of a motion estimation algorithm and a motion compensation algorithm.

In operation 530, the 3D image reproduction apparatus 100 may synthesize and output the left-eye image and the right-eye image in the 3D image format using the left-eye image and the right-eye image restored as the complete frame.

As described above, according to embodiments of the present invention, it is possible to support a 3D broadcast service based on a heterogeneous broadcast network by selecting a left-eye image and a right-eye image from a received broadcast stream based on a broadcast standard, and by synthesizing and outputting the selected left-eye image and right-eye image in a 3D image format.

The above-described embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory to (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An apparatus for reproducing a three-dimensional (3D) image, the apparatus comprising:
    one or more processors configured to:
    select a left-eye image and a right-eye image; and
    output a 3D image by synthesizing the left-eye image and the right-eye image,
    wherein a frame rate of the right-eye image as an additional image is that of the left eye image as a main image divided by an integer, which is one or greater than one,
    wherein, when the frame rate of the right-eye image is that of the left-eye image divided by an integer greater than one, the frames of left-eye to be matched to the counterparts are selected by timestamps in the same synchronization manner.

2. The apparatus of claim 1, wherein, when the frame rate of the right-eye image is that of the left-eye image divided by an integer, other than one, the frames of left-eye image to be matched to the counterparts are selected by timestamp offset.

3. The apparatus of claim 2, wherein the timestamp offset is determined based on difference between PTS and the RTP timestamp.

4. The apparatus of claim 3, wherein the PTS is timestamp of the left-eye image, and the RTP timestamp is timestamp of right-eye image.

5. A method of reproducing a three-dimensional (3D) broadcast service performed by a processor, the method comprising:
    selecting a left-eye image and a right-eye image; and
    outputting a 3D image by synthesizing the left-eye image and the right-eye image,
    wherein the left-eye image is transmitted according to main service,
    wherein the right-eye image is transmitted according to mobile service,
    wherein a frame rate of the right-eye image as an additional image is that of the left eye image as a main image divided by an integer, which is one or greater than one,
    wherein, when the frame rate of the right-eye image is that of the left-eye image divided by the integer greater than one, the frames of left-eye to be matched to the counterparts are selected by timestamps in the same synchronization manner.

6. The method of claim 5, wherein, when the frame rate of the right-eye image is that of the left-eye image divided by an integer, other than one, the frames of left-eye image to be matched to the counterparts are selected by timestamp offset.

7. The method of claim 6, wherein the timestamp offset is determined based on difference between PTS and the RTP timestamp.

8. The method of claim 5, wherein the PTS is timestamp of the left-eye image, and the RTP timestamp is timestamp of right-eye image.

9. A method of transmitting a three-dimensional (3D) image performed by a processor, the method comprising:
 identifying a left-eye image and a right-eye image for the 3D broadcast service;
 transmitting the left-eye image and the right-eye image,
 wherein a frame rate of the right eye image as an additional image is that of the left eye image as a main image divided by an integer, which is one or greater than one,
 wherein, when the frame rate of the right-eye image is that of the left-eye image divided by the integer greater than one, the frames of left-eye to be matched to the counterparts are selected by timestamps in the same synchronization manner.

10. The method of claim 9, wherein, when the frame rate of the right-eye image is that of the left-eye image divided by an integer, other than one, the frames of left-eye image to be matched to the counterparts are selected by timestamp offset.

11. The method of claim 10, wherein the timestamp offset is determined based on difference between PTS and the RTP timestamp.

12. The method of claim 11, wherein the PTS is timestamp of the left-eye image, and the RTP timestamp is timestamp of right-eye image.

\* \* \* \* \*